US011675518B2

(12) United States Patent
Salamon et al.

(10) Patent No.: US 11,675,518 B2
(45) Date of Patent: Jun. 13, 2023

(54) DETERMINING MIGRATIONS BETWEEN GEOGRAPHICALLY DISTRIBUTED DATA CENTERS

(71) Applicant: EMC IP Holding Company LLC, Hopkinton, MA (US)

(72) Inventors: Victor Salamon, Edmonton (CA); Alampalli Ravi Sankar Kishore, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 17/307,565

(22) Filed: May 4, 2021

(65) Prior Publication Data
US 2022/0357869 A1  Nov. 10, 2022

(51) Int. Cl.
*G06F 3/06*         (2006.01)
*G06F 11/30*        (2006.01)

(52) U.S. Cl.
CPC .......... *G06F 3/0647* (2013.01); *G06F 3/0604* (2013.01); *G06F 3/067* (2013.01); *G06F 3/0619* (2013.01); *G06F 11/3006* (2013.01); *G06F 11/3058* (2013.01); *G06F 11/3075* (2013.01)

(58) Field of Classification Search
CPC .... G06F 3/0647; G06F 3/0604; G06F 3/0619; G06F 3/067; G06F 11/3006; G06F 11/3058; G06F 11/3075
See application file for complete search history.

(56) References Cited

U.S. PATENT DOCUMENTS

| | | | |
|---|---|---|---|
| 2009/0106571 A1* | 4/2009 | Low | G06F 9/5094 709/224 |
| 2010/0211669 A1* | 8/2010 | Dalgas | G06F 9/50 709/224 |
| 2012/0130554 A1* | 5/2012 | Jain | G06F 9/5094 700/291 |
| 2017/0063622 A1* | 3/2017 | Yoshida | H04L 41/0836 |

(Continued)

OTHER PUBLICATIONS

"What is a data center migration?", VMWare, https://www.vmware.com/topics/glossary/content/data-center-migration#:~:text=What%20is%20a%20data%20center,as%20a%20data%20center%20relocation; last accessed May 4, 2021.

*Primary Examiner* — Ryan Bertram
(74) *Attorney, Agent, or Firm* — Ryan, Mason & Lewis, LLP

(57) ABSTRACT

Methods, apparatus, and processor-readable storage media for determining migrations between geographically distributed data centers are provided herein. An example computer-implemented method includes obtaining information associated with data centers that are geographically distributed relative to one another, wherein the information includes: information related to migration factors specific to the respective geographic location of each of the data centers and information related to a respective set of processes of each of the data centers; automatically generating a migration schedule based at least in part on the obtained information, wherein the migration schedule comprises one or more times for migrating at least one of the processes of a first one of the data centers to a second one of the data centers; and automatically triggering at least one migration of the at least one process between the data centers based at least in part on the migration schedule.

20 Claims, 6 Drawing Sheets

(56) References Cited

U.S. PATENT DOCUMENTS

| | | | |
|---|---|---|---|
| 2017/0220061 A1* | 8/2017 | Magcale | F16B 9/05 |
| 2018/0052704 A1* | 2/2018 | Ohnishi | H04L 67/10 |
| 2020/0257554 A1* | 8/2020 | Okuno | G06F 9/5077 |
| 2022/0075648 A1* | 3/2022 | Magcale | G05B 15/02 |
| 2022/0283836 A1* | 9/2022 | Goud | G06F 9/44505 |

* cited by examiner

300

302: RANK FORECAST SCORES ACROSS DATA CENTERS FROM LOW TO HIGH

304: FOR EACH APPLICATION OF THE DATA CENTER HAVING THE HIGHEST FORECAST SCORE: TRIGGER MIGRATION OF THE APPLICATION TO A DIFFERENT DATA CENTER HAVING A LOWER FORECAST SCORE IF THE FOLLOWING CONDITIONS ARE SATISFIED:

- THERE IS NO CONSTRAINT OR PREFERENCE (E.G., IN DATABASE 106) AGAINST MIGRATING THE APPLICATION TO THE DIFFERENT DATA CENTER;
- THE DIFFERENT DATA CENTER HAS CAPACITY TO RUN THE APPLICATION; AND
- THE COST OF MIGRATING THE APPLICATION IS LOWER THAN THE IMPROVEMENT TO BE GAINED (E.G., WITH RESPECT TO COST AND/OR TIME)

306: IF CONDITIONS ARE SATISFIED, THEN ATTEMPT MIGRATION OF APPLICATION TO THE DATA CENTER HAVING THE NEXT LOWEST FORECAST SCORE

DETERMINING MIGRATIONS BETWEEN GEOGRAPHICALLY DISTRIBUTED DATA CENTERS

FIELD

The field relates generally to information processing systems, and more particularly to migrations in such systems.

BACKGROUND

Organizations often utilize geographically distributed data centers. The processing load and power consumption of a given data center are dynamic and can fluctuate depending on a variety of factors such as, for example, environmental factors, time of day, and geographic location of the given data center. The environmental impact of the data center also tends to mirror the fluctuations in the power consumption of the data center.

SUMMARY

Illustrative embodiments of the disclosure provide techniques for determining migrations between geographically distributed data centers. An exemplary computer-implemented method includes obtaining information associated with at least two data centers that are geographically distributed relative to one another, wherein the information comprises: (i) information related to migration factors specific to the respective geographic location of each of the at least two data centers and (ii) information related to a respective set of processes of each of the at least two data centers; automatically generating a migration schedule based at least in part on the obtained information, wherein the migration schedule comprises one or more times for migrating at least one of the processes of a first one of the at least two data centers to a second one of the at least two data centers; and automatically triggering at least one migration of the at least one process between the at least two data centers based at least in part on the migration schedule.

Illustrative embodiments can provide significant advantages relative to conventional data center migration techniques. For example, challenges associated with high energy consumption are overcome in one or more embodiments by monitoring multiple factors across geographically distributed data centers over time and triggering migrations of processing between the data centers to reduce, for example, the overall environmental impact and/or cost attributed to the data centers.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for implementing at least a portion of a migration decision process in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
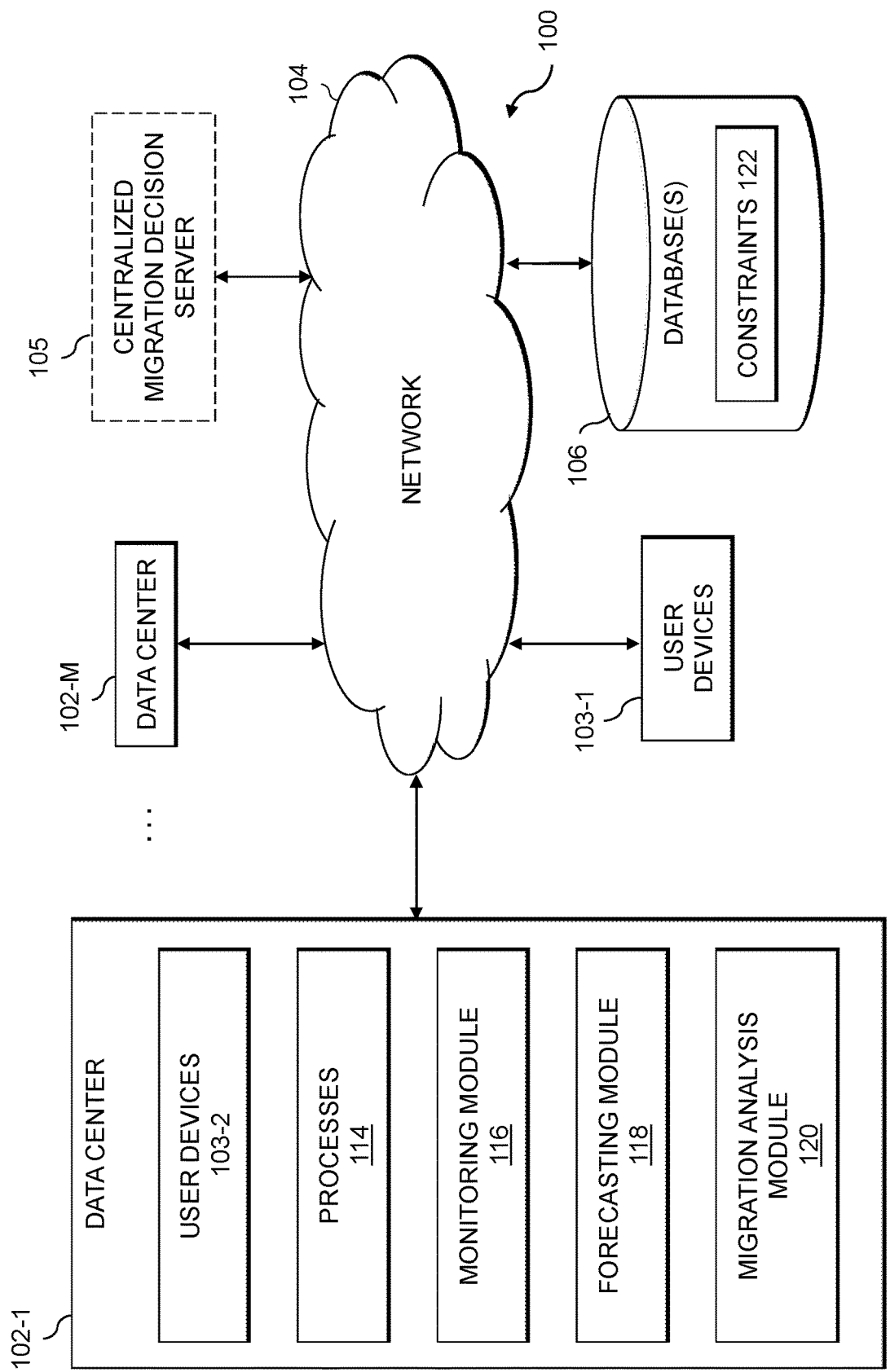
FIG. 1 shows an information processing system configured for determining migrations between geographically distributed data centers in an illustrative embodiment.

FIG. 1 shows a computer network (also referred to herein as an information processing system) 100 configured in accordance with an illustrative embodiment. The computer network 100 comprises a plurality of data centers 102-1, . . . 102-M, collectively referred to herein as data centers 102. The data centers 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Optionally, a centralized migration decision server is coupled to network 104.

In some embodiments, each of the data centers 102 may be associated with one or more user devices 103-1 and/or include components corresponding to one or more user devices 103-2 (collectively referred to herein as user devices 103). The user devices 103 may comprise, for example, Internet-of-Things (IoT) devices, devices with one or more IoT sensors embedded therein and/or positioned thereon, mobile telephones, laptop computers, tablet computers, desktop computers or other types of computing devices. Such devices are examples of what are more generally referred to herein as "processing devices." Some of these processing devices are also generally referred to herein as "computers."

The user devices 103 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

In some embodiments, at least a portion of the user devices 103 are one or more input-output devices, which illustratively comprise keyboards, displays or other types of input-output devices in any combination. Such input-output devices can be used, for example, to support one or more user interfaces to user devices 103, as well as to support communication between data centers 102, user devices 103, and other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

One or more of the data centers 102 can have at least one associated database 106 configured to store data pertaining to, for example, one or more constraints 122 associated with respective processes 114 (e.g., application and/or services) running at the corresponding one or more data centers 102.

An example database 106, such as depicted in the present embodiment, can be implemented using one or more storage systems associated with the data centers 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Additionally, each data center 102 and/or each user device 103 in the FIG. 1 embodiment is assumed to be implemented using at least one processing device. Each such processing device generally comprises at least one processor and an associated memory, and implements one or more functional modules for controlling certain features of the data center 102 and/or user device 103. However, it is to be appreciated that, in some embodiments, at least a portion of the user devices 103 may correspond to sensors, and thus lack a processor and/or memory.

More particularly, the data centers 102 and/or at least a portion of the user devices 103 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the data centers 102 and/or at least a portion of the user devices 103 to communicate over the network 104 with at least some of the data centers 102 and/or the user devices 103, and illustratively comprises one or more conventional transceivers.

According to one embodiment, one or more of the data centers 102 further comprise a monitoring module 116, a forecasting module 118, and a migration analysis module 120. In some example embodiments, the functionality associated with one or more of the monitoring module 116, the forecasting module 118, and the migration analysis module 120 may be implemented as an application or a service that is distributed among a virtual cluster of agents (e.g., using a circulating token in virtual synchrony), where each agent is executed at respective ones of the data centers 102.

An alternative embodiment is indicated using dashes in FIG. 1, wherein the computer network 100 includes a centralized migration decision server 105. In such an embodiment, the functionality associated with one or more of the monitoring module 116, the forecasting module 118, and the migration analysis module 120 is implemented at the centralized migration decision server 105. The centralized migration decision server 105 communicates with the data centers 102 in order to make migration decisions with respect to processes being executed at the data centers 102, as discussed in more detail elsewhere herein. Optionally, the centralized migration decision server 105 may be co-located with one of the data centers 102.

It is to be appreciated that this particular arrangement of modules 116, 118, and 120 illustrated in the data center 102-1 of the FIG. 1 embodiment is presented by way of example only, and alternative arrangements can be used in other embodiments. For example, the functionality associated with the modules 116, 118, and 120 in other embodiments can be combined into a single module, or separated across a larger number of modules. As another example, multiple distinct processors can be used to implement different ones of the modules 116, 118, and 120 or portions thereof.

At least portions of modules 116, 118, and 120 may be implemented at least in part in the form of software that is stored in memory and executed by a processor.

It is to be understood that the particular set of elements shown in FIG. 1 for data centers 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the data centers 102 and database(s) 106 can be on and/or part of the same processing platform.

An exemplary process utilizing modules 116, 118, and 120 of an example data center 102 in computer network 100 will be described in more detail with reference to, for example, the flow diagram of FIGS. 2 and 4.

Figure 2:
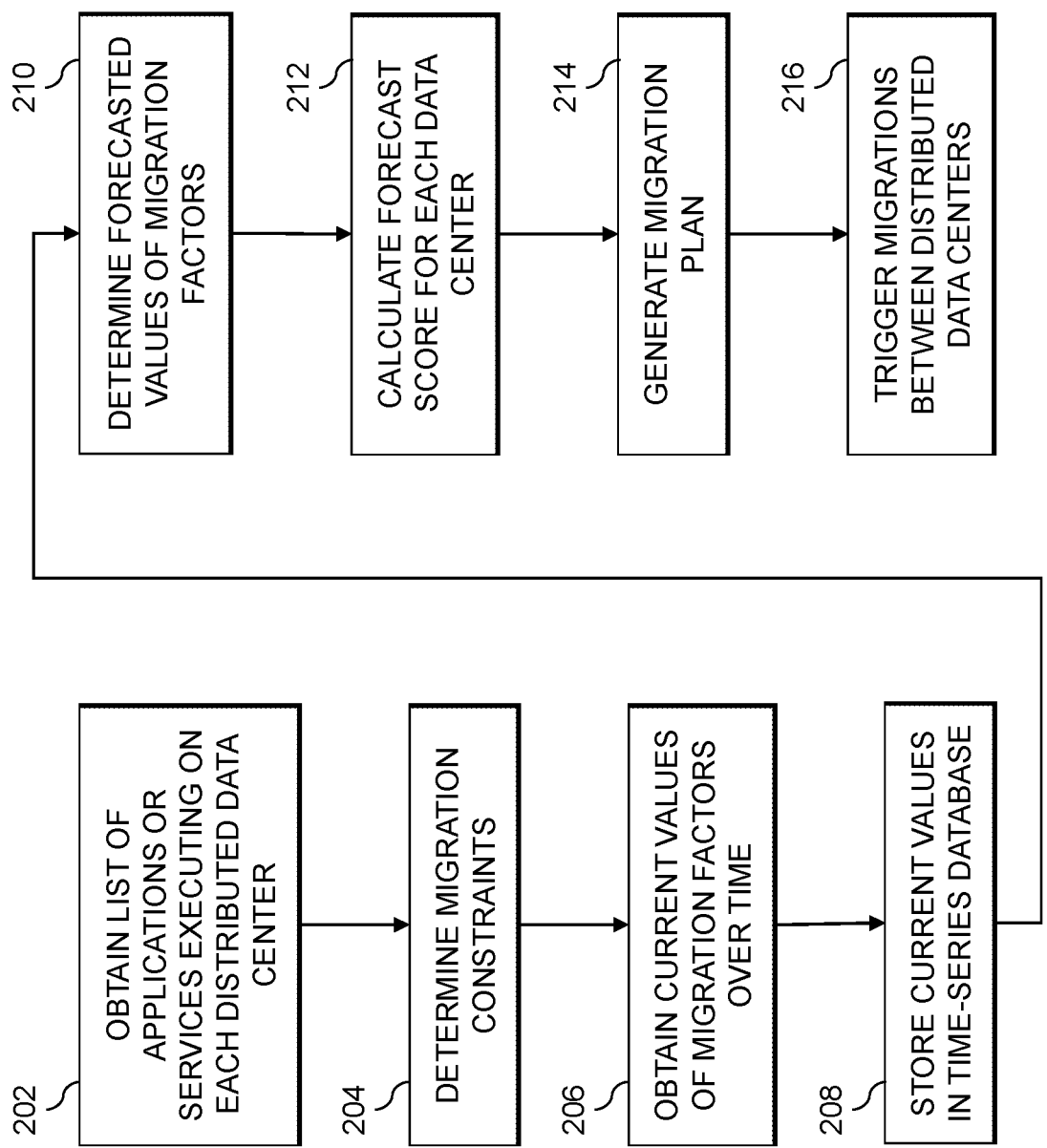
FIG. 2 shows an example of a migration decision process in an illustrative embodiment.

FIG. 2 is a process flow diagram of a migration decision process for geographically distributed data centers according to an illustrative embodiment. Step 202 includes obtaining a list of applications or services for each distributed data center that are currently running on-site. Step 204 includes determining, for each distributed data center, any migration constraints (or preferences) for each application or service on the list. In some example embodiments, the constraints may be provided by a site administrator of a given data center in order to prevent migration of particular applications or services based on one or more business rules. Non-limiting examples of such constraints include: time-based constraints (e.g., an application cannot be migrated outside maintenance windows); geography-based constraints (e.g., an application cannot be migrated to, or from, certain geographies); and fault-domain based constraints (e.g., a particular application needs to run on multiple fault domains so it cannot be migrated at the same time and/or to the same data center).

In at least some example embodiments, a migration agent, installed at each distributed data center 102, performs steps 206-216 at one or more specified time intervals (e.g., every minute, hour, half-day, etc.). Step 206 includes obtaining current migration factor values. For example, the migration factors may be related to electricity consumption, electricity cost per electricity unit, and environmental factors. The values may be collected from one or more sensors associated with the distributed data center. For example, the agent may read electricity consumption from an electric meter (such as, for example, via an application programming interface (API)), and collect information related to the unit cost of electricity (e.g., KWPH (Kilowatts Per Hour)) via an API from the electricity provider. In at least some examples, the agent may collect values for environmental factors from weather sensors associated with the distributed data center (e.g., external temperature from a thermometer).

Step 208 includes storing the values collected in step 206 in a time-series database. In some example embodiments, the values stored in the time-series database may be used to predict values for the migration factors, as described in more detail elsewhere herein.

Step 210 includes determining forecasted migration factor values for the next cycle time unit. As non-limiting examples, step 210 may include generating forecasts for at least one of: electricity consumption, unit cost of electricity, and weather. As an example, forecasting the cost of electricity may be performed by averaging the electricity consumption records from the time-series database, averaged at the particular time of the day, week, month, and/or year. For example, at 1:00 PM, the electricity consumption from the past 2 weeks may be averaged to represent the electricity consumption at 2:00 PM. The process can then be repeated for the next hour. As another example, the forecast of electricity cost may be obtained from the electrical company through one or more APIs, and forecasts for weather may be obtained via one or more APIs from an external weather forecasting service. The weather forecasts may include, for example, forecasts for temperature, cloud cover, rain, and/or forecasted natural disasters (such as storms, floods, etc.). Alternatively, or additionally, such forecasts may be derived from the time-series database in a similar manner as described above for electricity consumption. It is to be appreciated that other techniques or algorithms may be used for generating the forecasts, such as, for example, using one or more machine learning techniques.

Step 212 includes each agent of each distributed center calculating a forecast score for their respective data center 102. As a non-limiting example, the agents may calculate the forecast scores using the following equation: $FS=ECon*w1+ECost*w2+WT*w3$, where ECon is the value of the electricity consumption of the data center, ECost is the value of the electricity cost per electricity unit of the data center, WT is a value associated with weather (e.g., the value of the temperature), and w1, w2, and w3 are weighting factors. The weighting factors may be adjusted to control how much each of the terms is factored into the migration decisions. It is noted that in this example, the lower the value of each of the terms in the equation the better the score is for the data center in terms of energy impact.

Step 214 includes generating a migration plan for the distributed data centers based on the forecast scores, and step 216 includes triggering migrations between the distributed data centers. An example of an algorithm for implementing steps 214 and 216 is described in more detail in conjunction with FIG. 3. It is noted that steps 214 and 216 may be performed using a distributed approach among the data centers (e.g., based on a circulating token). Alternatively, the distributed data centers may communicate the forecast scores to a centralized server (e.g., centralized migration decision server 105 in FIG. 1). In some examples, the centralized migration decision server 105 may also calculate the forecast scores for each of the data centers 102 by collecting the current and/or forecasted values (e.g., from the data centers or via APIs similarly as described above), for example.

FIG. 3 shows example pseudocode for implementing at least a portion of a migration decision process in an illustrative embodiment. In this embodiment, example pseudocode 300 is executed by or under the control of at least one processing system and/or device. For instance, the example pseudocode 300 may be viewed as comprising a portion of a software implementation of at least part of data centers 102 and/or the centralized migration decision server 105 of the FIG. 1 embodiment.

The pseudocode 300 depicts steps for planning and triggering migrations between distributed data centers. In this example, it is assumed that the forecast scores are calculated in a similar manner as in the example given in conjunction with step 212 of FIG. 2. Step 302 of the pseudocode 300 includes ranking the forecast scores across distributed data centers from low to high. Step 304 includes, for each application (or service) of the data center having the highest forecast score, triggering migration of the application to a different data center having a lower forecast score if the following conditions are satisfied: there is no constraint or preference (e.g., as specified in database 106) against migrating the application to the different data center; the different data center has capacity to run the application; and the cost of migrating the application is lower than the improvement to be gained (e.g., with respect to cost and/or time). If the conditions are satisfied then, step 306 then attempts migration of the current application to the different data center having the next lowest forecast score.

It is to be appreciated that this particular example pseudocode shows just one example implementation of a portion of a migration decision process, and alternative implementations of the process can be used in other embodiments. For example, in some embodiments all of the conditions set forth in step 304 need to be satisfied for migration to get triggered, whereas in other embodiments only a subset of the conditions need to be satisfied.

Figure 4:
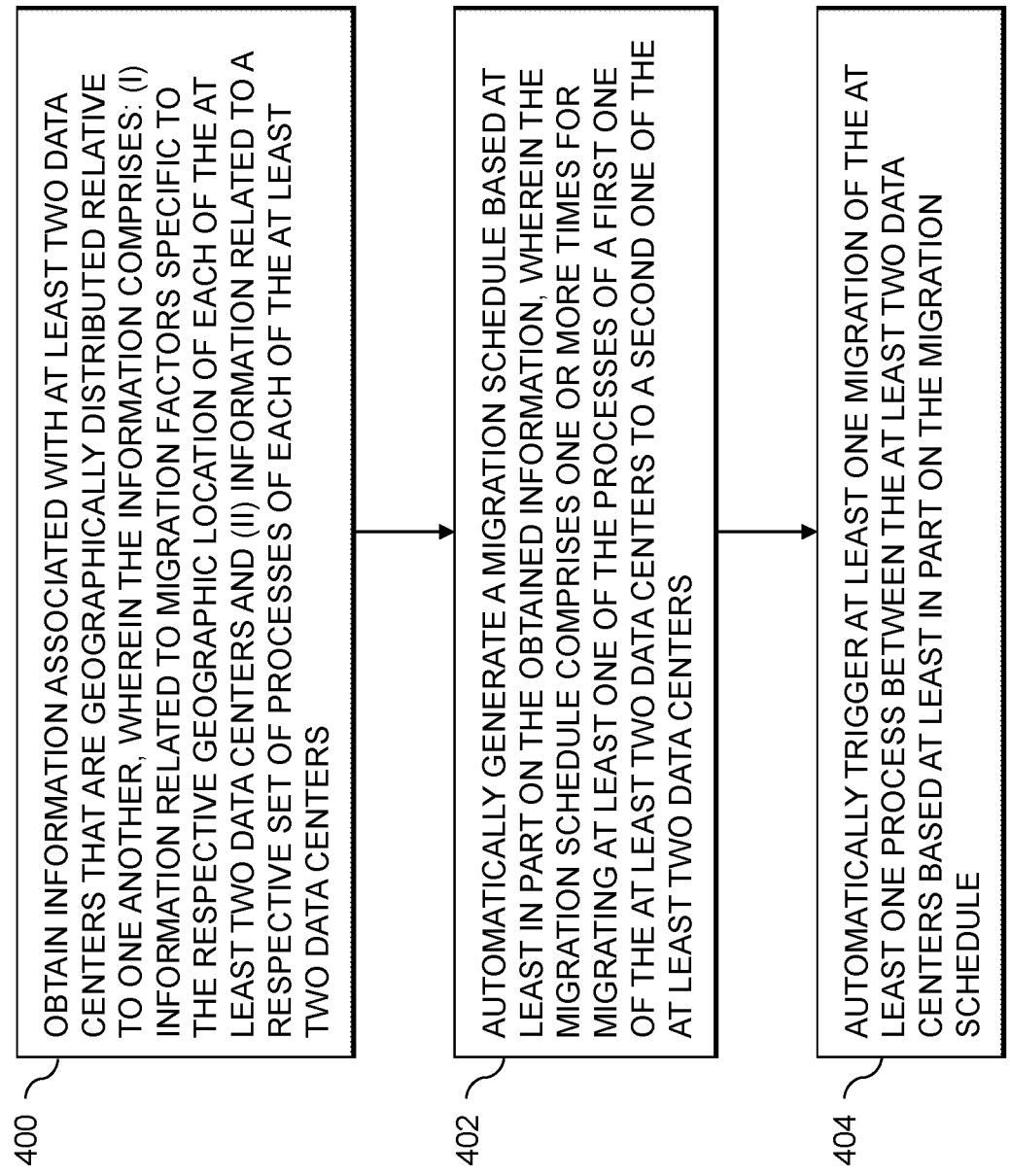
FIG. 4 shows a flow diagram of a process for determining migrations between geographically distributed data centers in an illustrative embodiment.

FIG. 4 is a flow diagram of a process for optimizing geographically distributed data centers in an illustrative embodiment. It is to be understood that this particular process is only an example, and additional or alternative processes can be carried out in other embodiments. In this embodiment, the process includes steps 400 through 404. These steps are assumed to be performed by at least one of the data centers 102 utilizing its modules 116, 118, and 120.

Step 400 includes obtaining information associated with at least two data centers that are geographically distributed relative to one another, wherein the information comprises: (i) information related to migration factors specific to the respective geographic location of each of the at least two data centers and (ii) information related to a respective set of processes of each of the at least two data centers. Step 402 includes automatically generating a migration schedule based at least in part on the obtained information, wherein the migration schedule comprises one or more times for migrating at least one of the processes of a first one of the at least two data centers to a second one of the at least two data centers. Step 404 includes automatically triggering at least one migration of the at least one process between the at least two data centers based at least in part on the migration schedule.

The information related to the migration factors for a given one of the at least two data centers may include at least one of: climate data specific to the geographic location of the given data center; and energy consumption data specific to the given data center. The generating in step 402 may include: forecasting values for at least one of the migration factors based at least in part on at least one of the climate data and the energy consumption data. At least a portion of the climate data may be obtained from one or more sensors associated with the given data center. At least a portion of the energy consumption data may be obtained from one or more sensors associated with the given data center.

The process depicted in FIG. 4 may include the step of storing at least one of the climate data and the obtained energy consumption data obtained from the one or more sensors in a time-series database. At least a portion of the climate data and/or at least a portion of the energy consumption data may be obtained via one or more application programming interfaces for one or more of a weather service and an energy provider. The energy consumption data may include at least one of: electricity consumption data and a unit cost of electricity. The step of generating may be based at least in part on one or more constraints specified for a given one of the processes of at least one of the first data center and the second data center. The one or more constraints comprise at least one of: a time constraint for the given process; a geographic constraint for the given process; and a fault domain for the given process. The step of generating may include: computing forecast scores for the at least two data centers based at least in part on the information related to the migration factors; ranking the at least two data centers based on their respective forecast scores; and selecting the one or more times of the migration schedule based at least in part on the ranking and computing capacities of at least a portion of the at least two data centers. The set of processes may correspond to at least one of: one or more applications; and one or more services.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly reduce the environmental impact and/or power costs across multiple data centers. These and other embodiments can effectively overcome problems associated with existing migration techniques that do not consider geographic specific factors across multiple data centers. For example, some embodiments are configured to monitor multiple factors across geographically distributed data centers over time and trigger migrations of processing between such data centers. These and other embodiments can effectively reduce the overall environmental impact and power costs attributed to the data centers relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
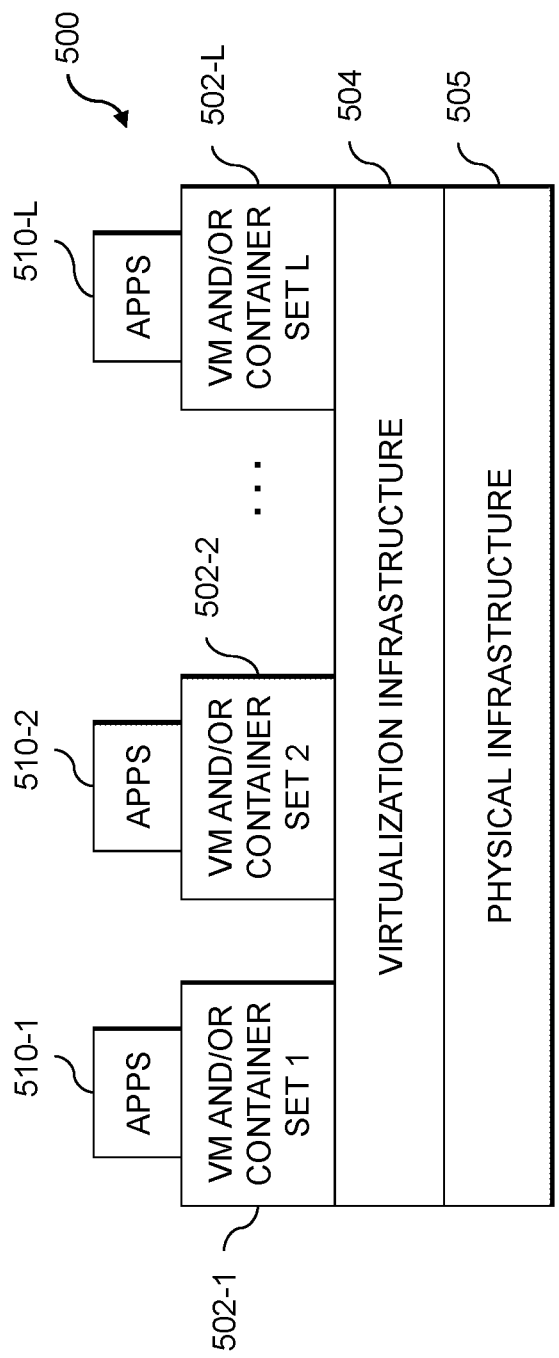
FIGS. 5 and 6 show examples of processing platforms that may be utilized to implement at least a portion of an information processing system in illustrative embodiments.

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

Figure 6:
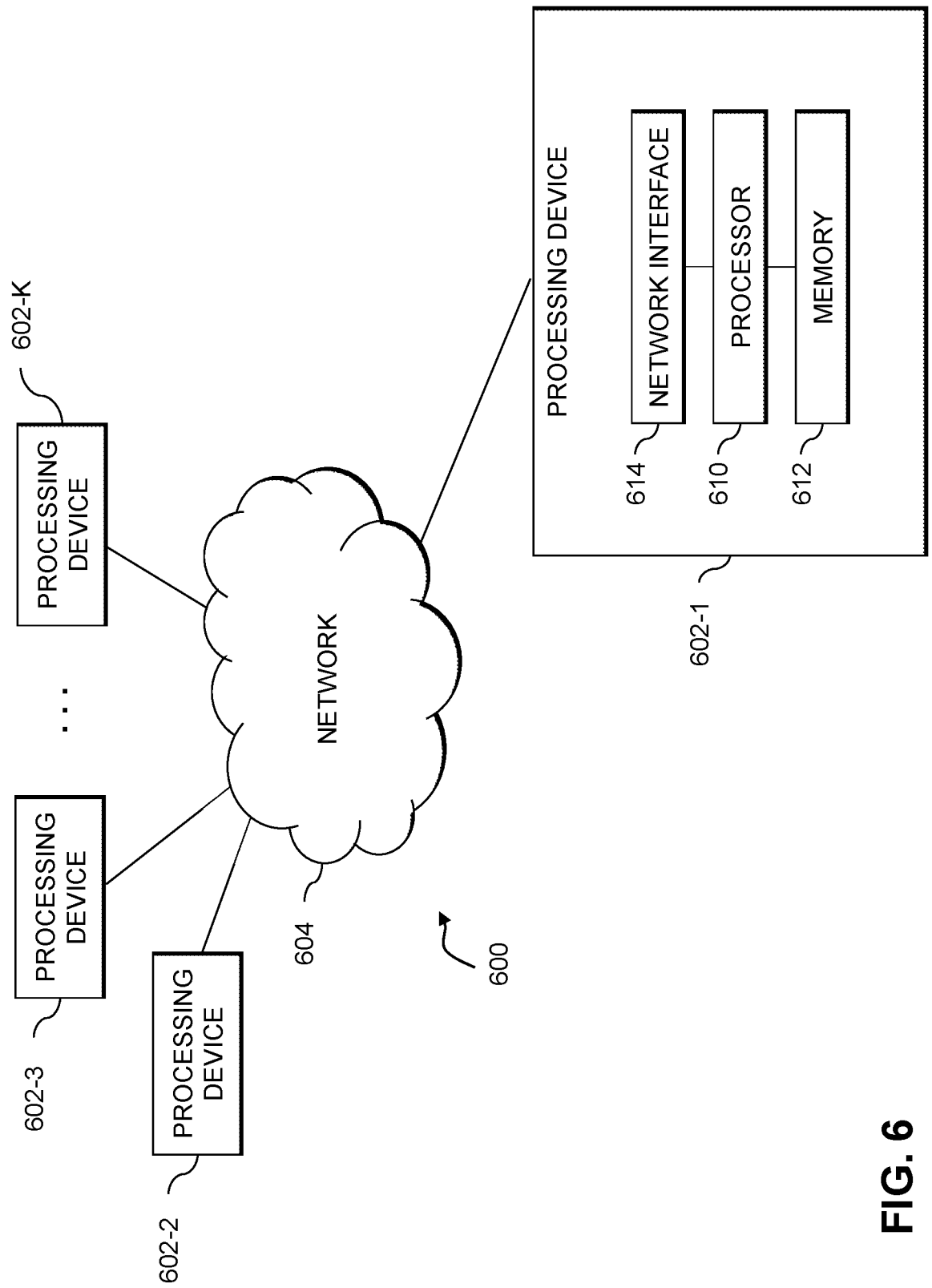

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining forecast scores from at least two data centers that are geographically distributed relative to one another, wherein the forecast scores are computed based on information comprising: (i) information related to migration factors specific to the respective geographic location of each of the at least two data centers and (ii) information related to a respective set of processes of each of the at least two data centers;
    automatically generating a migration schedule based at least in part on the obtained forecast scores, wherein the migration schedule comprises one or more times for migrating at least one of the processes of a first one of the at least two data centers to a second one of the at least two data centers, wherein the generating comprises: ranking the at least two data centers based on their respective forecast scores; and selecting the one or more times of the migration schedule based at least in part on: (i) the ranking and computing capacities of at least a portion of the at least two data centers, and (ii) an expected cost of migrating the at least one of the processes; and
    automatically triggering at least one migration of the at least one process between the at least two data centers based at least in part on the migration schedule;
    wherein the method is performed by at least one processing device comprising a processor coupled to a memory.

2. The computer-implemented method of claim 1, wherein the information related to the migration factors for a given one of the at least two data centers comprises at least one of:
    climate data specific to the geographic location of the given data center; and
    energy consumption data specific to the given data center.

3. The computer-implemented method of claim 2, wherein the generating comprises:
    forecasting values for at least one of the migration factors based at least in part on at least one of the climate data and the energy consumption data.

4. The computer-implemented method of claim 3, wherein at least one of: at least a portion of the climate data and at least a portion of the energy consumption data is obtained from one or more sensors associated with the given data center, and wherein the method comprises:
    storing at least one of the climate data and the obtained energy consumption data obtained from the one or more sensors in a time-series database.

5. The computer-implemented method of claim 3, wherein at least one of: at least a portion of the climate data and at least a portion of the energy consumption data is obtained via one or more application programming interfaces for one or more of a weather service and an energy provider.

6. The computer-implemented method of claim 3, wherein the energy consumption data comprises at least one of: electricity consumption data and a unit cost of electricity.

7. The computer-implemented method of claim 1, wherein the generating is based at least in part on one or more constraints specified for a given one of the processes of at least one of the first data center and the second data center.

8. The computer-implemented method of claim 7, wherein the one or more constraints comprise at least one of:
    a time constraint for the given process;
    a geographic constraint for the given process; and
    a fault domain for the given process.

9. The computer-implemented method of claim 1, wherein the set of processes correspond to at least one of:
    one or more applications; and
    one or more services.

10. A non-transitory processor-readable storage medium having stored therein program code of one or more software programs, wherein the program code when executed by at least one processing device causes the at least one processing device:
    to obtain forecast scores from at least two data centers that are geographically distributed relative to one another, wherein the forecast scores are computed based on information comprising (i) information related to migration factors specific to the respective geographic location of each of the at least two data centers and (ii) information related to a respective set of processes of each of the at least two data centers;
    to automatically generate a migration schedule based at least in part on the obtained information, wherein the migration schedule comprises one or more times for migrating at least one of the processes of a first one of the at least two data centers to a second one of the at least two data centers, wherein the generating comprises: ranking the at least two data centers based on their respective forecast scores; and selecting the one or more times of the migration schedule based at least in part on: (i) the ranking and computing, capacities of at least a portion of the at least two data centers, and (ii) an expected cost of migrating the at least one of the processes; and
    to automatically trigger at least one migration of the at least one process between the at least two data centers based at least in part on the migration schedule.

11. The non-transitory processor-readable storage medium of claim 10, wherein the information related to the migration factors for a given one of the at least two data centers comprises at least one of:
    climate data specific to the geographic location of the given data center; and
    energy consumption data specific to the given data center.

12. The non-transitory processor-readable storage medium of claim 11, wherein the generating comprises:
    forecasting values for at least one of the migration factors based at least part on at least one of the climate data and the energy consumption data.

13. The non-transitory processor-readable storage medium of claim 10, wherein the generating is based at least in part on one or more constraints specified for a given one of the processes of at least one of the first data center and the second data center.

14. The non-transitory processor-readable storage medium of claim 13, wherein the one or more constraints comprise at least one of:
a time constraint for the given process;
a geographical constraint for the given process; and
a fault domain for the given process.

15. An apparatus comprising:
at least one processing device comprising a processor coupled to a memory;
the at least one processing device being configured:
to obtain forecast scores from at least two data centers that are geographically distributed relative to one another, wherein the forecast scores are computed based on information comprising: (i) information related to migration factors specific to the respective geographic location of each of the at least two data centers and (ii) information related to a respective set of processes of each of the at least two data centers;
to automatically generate a migration schedule based at least in part on the obtained information, wherein the migration schedule comprises one or more times for migrating at least one of the processes of a first one of the at least two data centers to a second one of the at least two data centers, wherein the generating comprises: ranking the at least two data centers based on their respective forecast scores; and selecting the one or more times of the migration schedule based at least in part on: (i) the ranking and computing capacities of at least a portion of the at least two data centers, and (ii) an expected cost of migrating the at least one of the processes; and
to automatically trigger at least one migration of the at least one process between the at least two data centers based at least in part on the migration schedule.

16. The apparatus of claim 15, wherein the information related to the migration factors for a given one of the at least two data centers comprises at least one of:
climate data specific to the geographic location of the given data center; and
energy consumption data specific to the given data center.

17. The apparatus of claim 15, wherein the generating is based at least in part on one or more constraints specified for a given one of the processes of at least one of the first data center and the second data center, wherein the one or more constraints comprise at least one of:
a time constraint for the given process:
a geographical constraint for the given process; and
a fault domain for the given process.

18. The apparatus of claim 16, wherein the generating comprises:
forecasting values for at least one of the migration factors based at least in part on at least one of the climate data and the energy consumption data.

19. The apparatus of claim 15, wherein the set of processes correspond to at least one of:
one or more applications; and
one or more services.

20. The non-transitory processor-readable storage medium of claim 10, wherein the set of processes correspond to at least one of:
one or more applications; and
one or more services.

\* \* \* \* \*